United States Patent Office 3,125,849
Patented Mar. 24, 1964

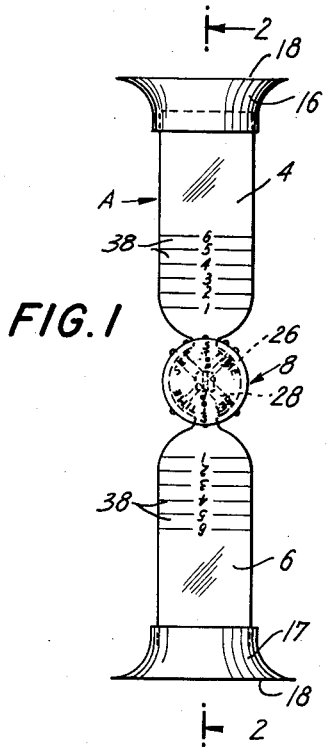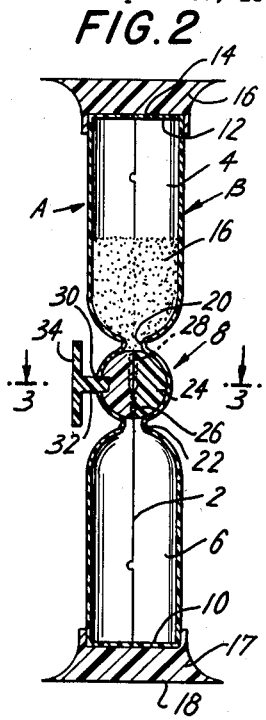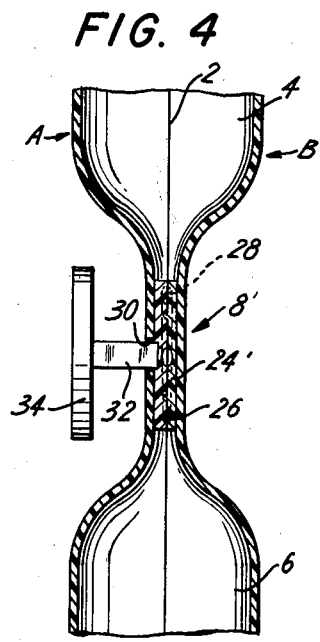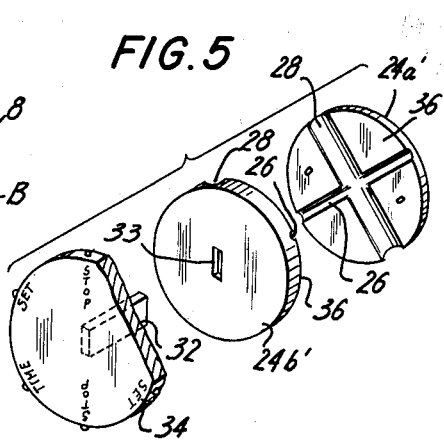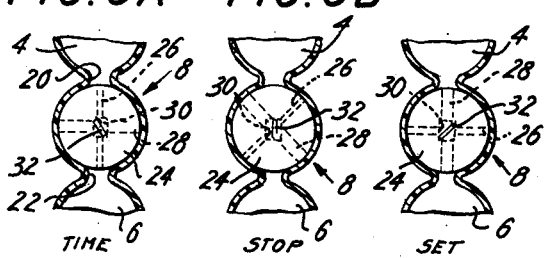

3,125,849
TIMING DEVICE
Jack S. Wachtel, 48 Franklin Road, Scarsdale, N.Y.
Filed Apr. 10, 1961, Ser. No. 101,696
3 Claims. (Cl. 58—144)

The present invention relates to a settable timing device, and more specifically to a timing device of the hourglass type which can readily be set to measure different periods of time.

Devices of the hourglass type are provided with a pair of chambers connected by a restricted opening, a supply of flowable medium being adapted to pass from one chamber to the other, usually under the influence of gravity. The rate of flow is determined jointly by the size of the passage between the chambers and the nature of the medium provided, the amount of medium being such that it will take a predetermined period of time for all of the material to flow from one chamber into the other. Thus a device of this type is effective to measure only that predetermined period of time for which it is specifically designed. It cannot conveniently or accurately be used to measure any lesser period of time.

In this regard it must be borne in mind that for accurate measurement it is essential that the timing device be capable of starting more or less precisely at the instant desired, operating at substantially the same rate of flow throughout, and indicating with definitiveness when the timed interval has passed. With conventional "hourglass" devices the beginning of the timing is instituted by turning the device so that the chamber containing all of the flowable medium is uppermost. The end of the timing interval is indicated when the last particle of flowable medium has left the uppermost chamber. Any attempt to use the level of material in the uppermost chamber to indicate the expiration of any intermediate period of time is only approximate, since that level is always changing while the device is timing and is usually not planar while the device is timing.

It is the prime object of the present invention to devise a timing device of the hourglass type which is not only capable of accurately measuring a predetermined period of time, but which may also be used for accurate measurement of any lesser period of time. Thus, for example, a device designed for measuring a maximum of six minutes can also be used for the accurate measurement of two, three or four minutes, and the like.

It is a further prime object of the present invention that this flexibility of use, heretofore not capable of attainment in devices of the type under discussion, be accomplished without any sacrifice in the accuracy of the commencement of the timed interval and the indication of the termination of that interval.

It is another object of the present invention to devise a timing device of the type under discussion in which the timing operation may be initiated in a way other than by actually physically inverting the device, since the step of physical inversion itself takes an appreciable period of time, and the manner in which that inversion is accomplished may affect the accuracy of the timing operation.

It is a further object of the present invention to provide a device of the character described which is simple and inexpensive to manufacture, and the parts of which may be fabricated in a manner particularly well adapted to large scale low cost manufacture.

As here disclosed the device is provided, as is conventional, with a pair of chambers adapted to contain a flowable medium, those chambers being adapted selectively to be positioned one above the other. A passage is provided between the chambers through which the medium may flow. Interposed in that passage is a member which is movable between a plurality of operative positions. In a first of those operative positions the member is effective to cause a slow timed flow of the medium through the passage, the device then functioning in conventional timing fashion. In a second operative position of the member relatively rapid flow of medium from one chamber to the other is permitted. This enables the user to quickly set the device for the measurement of a smaller period of time by reducing the amount of medium in the uppermost chamber to a quantity corresponding to the smaller period of time to be measured. In a third operative position the member blocks all flow of medium from one chamber to the other.

Thus, when a given chamber contains all of the flowable medium and that chamber is located in an uppermost position, the controlling member is normally located in its third operative position, the device then "standing by," ready to measure the maximum period of time for which it is designed, If one wishes to measure that maximum period, the member is moved to its first operative position, and the termination of the measured period of the measured period of time is indicated when the last particle of medium leaves the uppermost chamber. The movement of the member from its third (stopping) operative position to its first (timing) operative position is rapidly accomplished, and the manner of that movement does not adversely affect the accuracy of the timing operation performed.

If it is desired to measure a lesser period of time, the member is moved to its second (setting) operative position, and is retained in that position, the medium flowing rapidly from the uppermost to the lowermost chamber, until the amount of medium remaining in the uppermost chamber corresponds to the lesser period of time which it is desired to measure. This can conveniently be determined by means of graduations provided on a transparent wall portion of the chamber which contains the medium. When the proper amount of medium remains in the uppermost chamber, the member is moved to its third (stopping) position, and the device is then ready for operation. Measurement of this lesser period of time is initiated by moving the member to its first (timing) position, and the end of the measured period of time is definitively indicated when the last particle of medium leaves the uppermost chamber.

This novel and flexible mode of operation is accomplished, as here specifically disclosed, by interposing between the chambers a movable member having a pair of openings therethrough, one of them being of restricted size to produce the timing operation and the other being of a larger size so that the medium will flow therethrough much more rapidly. The first (timing), second (setting) and third (stopping) operative positions of the member correspond respectively to the bringing of the restricted passage into communication between the chambers, bringing the wider passage into such communication, and bringing neither passage into such communication, the body of the member then interrupting all flow from one chamber to the other.

To the accomplishment of the above, and to such other objects as may hereinafter appear, the present invention relates to the construction of an adjustable timing device, as defined in the appended claims, and as described in this specification, taken together with the accompanying drawings, in which:

FIG. 1 is a front elevational view of one embodiment of the present invention;

FIG. 2 is a cross sectional view taken along the line 2—2 of FIG. 1;

FIG. 3 is a cross sectional view on an enlarged scale, taken along the line 3—3 of FIG. 2;

FIG. 4 is a fragmentary cross sectional view, similar to FIG. 2 but on an enlarged scale, of an alternative embodiment;

FIG. 5 is a three-quarter perspective exploded view of the controlling parts of the embodiment of FIG. 4; and FIGS. 6A, 6B and 6C are diagrammatic views showing the control member in its first (timing), third (stopping) and second (setting) operative positions respectively.

Turning first to the embodiment of FIGS. 1, 2 and 3 the body of the timing device may be formed of two molded shells A and B joined along the line 2 to define a housing having chambers 4 and 6 separated by a passage part generally designated 8. The end walls of the chambers 4 and 6 are designated 10 and 12 respectively, and the end wall 12 may be provided with an opening 14 through which a predetermined amount of flowable medium 16 such as sand may be inserted into the device. The ends of the chambers 4 and 6 are received in base parts 17 having flat end surfaces 18, thereby permitting the device to stand upright on either end. The base 16 for the chamber 4 covers and closes the opening 14, thereby preventing the escape of the flowable material 16 once the device has been assembled and filled.

In the embodiment under discussion the passage portion 8 is spherical in nature and communicates with the chambers 4 and 6 by means of the passages 20 and 22 respectively. A valve member 24 of ball shape, provided with a pair of intersecting diametric through openings 26 and 28, is snugly and rotatably fitted within. The opening 26 is of a narrow width such that the flowable medium 16 can pass therethrough only at a relatively slow rate in order to perform a timing operation. The opening 28 is several times wider than the opening 26, so that the medium 16 can flow rapidly therethrough. The rear surface of the housing passage portion 8 is provided with an aperture 30 through which the shaft 32 of a control knob 34 is adapted to rotatably pass, the inner end of that shaft 30 being secured to the valve member 24 in any appropriate manner, as by being snapped, press-fitted, or cemented into an opening 33 formed in the valve member 24. As indicated in FIG. 3, the valve member 24 may conveniently be formed in two halves 24a, 24b engaging one another along the line 36, registering grooves being formed in the facing surfaces of the halves 24a and 24b in order to define the through openings 26 and 28.

The valve member 24 is manually rotatable through manipulation of the control knob 34 between the three operative positions shown respectively in FIGS. 6A, 6B and 6C. In the first or "timing" operative position shown in FIG. 6A the restricted through opening 26 is brought into registration with the passages 20 and 22 communicating respectively with the chambers 4 and 6. Thus the medium 16 can flow from the uppermost chamber to the lowermost only through the restricted passage 26, that flow will be at a relatively low rate, and a timing operation will be performed. Hence this first operative position has been termed the "timing" position of the valve member 24.

In the second operative position of the valve member 24 as illustrated in FIG. 6C it is the relatively wide through opening 28 which is in registration with the passages 20 and 22, and hence the medium 16 can flow rapidly therethrough from the uppermost chamber to the lowermost. This operative position of the valve member 24 is utilized to quickly reduce the amount of medium 16 in the uppermost chamber to a quantity suitable for measuring a small period of time, and accordingly this operative position of the valve member 24 is termed its "setting" position, since it "sets" the device to time a desired interval.

In the third operative position of the valve member 24 shown in FIG. 6B, neither of the through openings 26 or 28 is in registration with the passages 20 and 22, the body of the valve member 24 blocks flow communication between the chambers 4 and 6, and the device is put into a "stand-by" condition. This operative position of the valve member 24 is termed its "stopping" position, since it stops the timing operation.

The embodiment of FIGS. 4 and 5 is essentially similar to that of FIGS. 1–3, except that the passage portion 8' is flat rather than spherical in shape, and the valve member 24' is in the form of a disk rather than a sphere. The parts of the embodiment of FIGS. 4 and 5 have been numbered the same as the corresponding parts in the embodiment of FIGS. 1–3, and where there are specific differences between the parts those differences have been indicated by using primed reference numerals.

Means are preferably provided for limiting the movement of the valve member 24 between its extreme operative positions. As here disclosed that limitation of movement is accomplished by utilizing a control knob shaft 32 having a non-circular cross section and by so shaping the opening 30 in the housing through which the shaft 32 passes, as indicated in FIGS. 6A, B and C, as to cooperate with the side surfaces of the shaft 32. Thus when the shaft 32 is rotated in a clockwise direction as viewed in FIG. 6C the shaft will engage with the sides of the opening 30, thus fixing the valve member 24 in its setting position and preventing it from being turned beyond that position. When the shaft 32 is rotated fully in counter-clockwise direction to the position shown in FIG. 6A, the shaft 32 will again engage the sides of the opening 30, thus fixing the valve member 24 in its timing position and preventing it from being turned beyond that position. Instead of positive stops detents could be employed, and detent action could be used to retain the valve member 24 in its stopping position.

All of the parts may readily be molded from suitable plastic material, thus adapting the construction for inexpensive large scale production. The chambers 4 and 6 advantageously have transparent wall parts, so that the quantity of medium 16 in a given chamber may readily be observed, and the chamber walls may be provided with visible graduations 38 so correlated with the nature of the flowable medium 16 and the size of the restricted through opening 26 as to indicate progressive timed intervals, such as minutes. Indicia may be provided on the control knob 34 or on the housing or both to indicate the position of the valve member 24.

The manner of use of the device will in the main be apparent from the above description. As illustrated, the device is designed for timing a maximum interval of six minutes, and when all of the medium 16 is in a given chamber, such as the chamber 4, and when that chamber is uppermost, the upper level of the medium 16 will coincide with the indicating mark 38 representing six minutes. When the valve member 24 is turned from its stopping position to its timing position the medium will flow through the passage 20, the through opening 26, and the passage 22 into the lowermost chamber 6 at a controlled and known rate, the upper level of the medium 16 in the chamber 4 will drop, and the end of the six-minute period will be definitively indicated when the last particle of the flowing medium 16 leaves the chamber 4, as will be visible to external observation. It will be noted that the movement of the valve member 24 from its stopping to its timing position may be accomplished rapidly and therefore accurately. It will further be noted that such movement of the member 24 imparts no kinetic energy to the medium 16 itself, and thus does not affect the accuracy of the timing.

If one desires to measure a shorter period of time, for example, four minutes, one will turn the valve member 24 to its setting position. The medium 16 will flow rapidly from the chamber 4 to the chamber 6, and when the upper level of the medium reaches the graduation 38 corresponding to four minutes, which will occur in just a second or so rather than two minutes, the valve member 24 is turned back to its stopping position, and the device is then set for the accurate timing of a four-minute period. Depending upon the degree of accuracy required, one may carefully adjust and even out the upper surface of the medium 16 to correspond more or less exactly to the indicia 38 corresponding to the four-minute timing period desired.

After a given timing interval has been measured, that measurement terminating with the passage of the last particle of the medium 16 from the uppermost chamber into the lowermost chamber, the valve member 24 is turned to its stop position, the device is inverted, and it is then ready for renewed operation either for the measurement of a six-minute period or any shorter period.

The device may also be used to measure elapsed time, such as the duration of a telephone call or the time it takes a contestant to perform a particular act. A given chamber, such as the chamber 4, is positioned uppermost with the full amount of medium 16 therein and with the valve 8 in its "stop" position. When the time interval to be measured commences, the valve 8 is turned to its "time" position, and when the time interval is terminated the valve 8 is again moved to its "stop" position. Observation of the upper level of the medium 16, and comparison of that with its initial level, would indicate the elapsed time. If desired, graduations may be placed on the wall of the chamber reading in reverse order from those shown on the drawings, thereby to facilitate indication of the amount of time which has elapsed. When the device is used in this fashion, and after the time interval in question has been measured, the valve 8 is turned to its "set" position in order to permit the rapid filling of a chamber 4 or 6 with the totality of the medium 16, thereby conditioning the device for a subsequent measuring operation.

While but a limited number of embodiments of the present invention have been here specifically illustrated, it will be apparent that many variations may be made in the specific structure thereof, all within the scope of the invention as defined in the following claims.

I claim:

1. An adjustable timer comprising a housing having a pair of chambers connected by passage means communicating from one chamber to the other, said chambers being adapted to contain a flowable medium movable from one chamber to the other through said passage means, adjustable valve means in said passage means for selectively permitting comparatively free or comparatively restricted flow of said medium through said passage means from either chamber to the other, said valve means having a plurality of separate through openings therein, one independent of the other, one through opening being comparatively of narrow size and the other through opening being comparatively of wide size, and means to adjust the said valve means between first and second operative positions to selectively bring the narrow through opening to the first valve position into communication between the pair of chambers to permit the comparatively restricted flow between the chambers from either chamber to the other or to bring the wide through opening to the second valve position into communication between the pair of chambers to permit the comparatively free flow between the chambers from either chamber to the other.

2. In the adjustable timer of claim 1, control means accessible from the exterior of said housing and operatively connected to said valve means to position the latter.

3. An adjustable timer comprising a housing defining a pair of chambers connected by passage means communicating from one chamber to the other, said chambers being adapted to contain a flowable medium movable from one chamber to the other through said passage means, said housing being movable between positions in which one or the other of said chambers is uppermost, adjustable valve means in said passage means for selectively permitting comparatively free or comparatively restricted flow of said medium through said passage means from either chamber to the other, said valve means having a plurality of separate through openings therein, one independent of the other, one through opening being comparatively of narrow size and the other through opening being comparatively of wide size, and means to adjust the said valve means between first and second operative positions to selectively bring the narrow through opening to the first valve position into communication between the pair of chambers to permit the comparatively restricted flow between the chambers from either chamber to the other or to bring the wide through opening to the second valve position into communication between the pair of chambers to permit the comparatively free flow between the chambers from either chamber to the other.

References Cited in the file of this patent

UNITED STATES PATENTS

| | | |
|---|---|---|
| 330,180 | White | Nov. 10, 1885 |
| 421,224 | Applegarth | Feb. 11, 1890 |
| 444,506 | Robinson | Jan. 13, 1891 |
| 839,134 | Gustafson | Dec. 25, 1906 |
| 1,670,002 | Pferdmenges | May 15, 1928 |
| 2,625,003 | Burden | Jan. 13, 1953 |
| 2,890,856 | Clade | June 16, 1959 |
| 2,965,313 | Jay | Dec. 20, 1960 |

FOREIGN PATENTS

| | | |
|---|---|---|
| 16,875 | Great Britain | July 15, 1910 |